June 12, 1928.                         1,673,164
E. SILEN
STEAMER
Filed Aug. 16, 1927
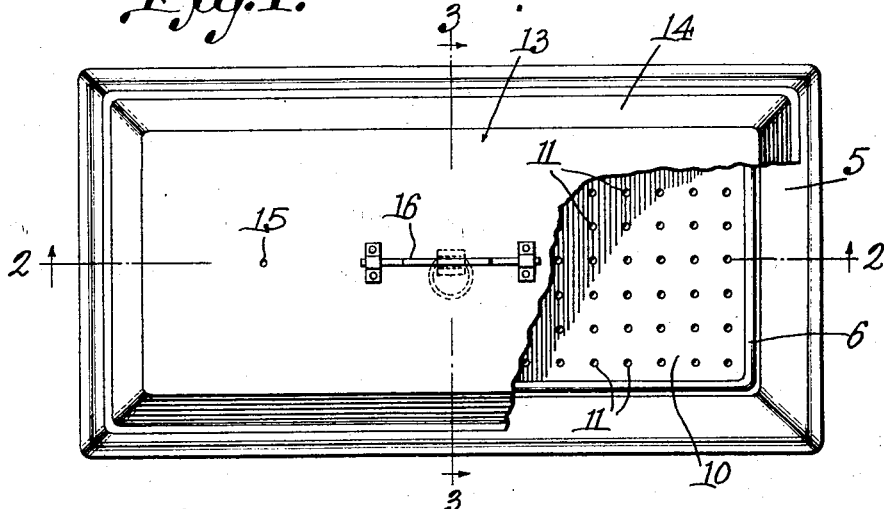
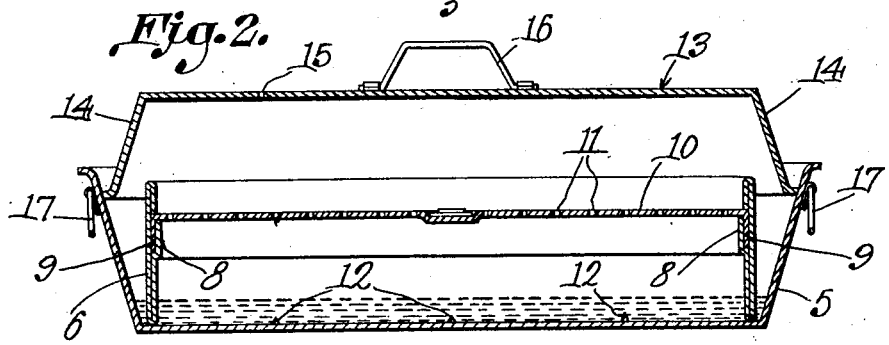
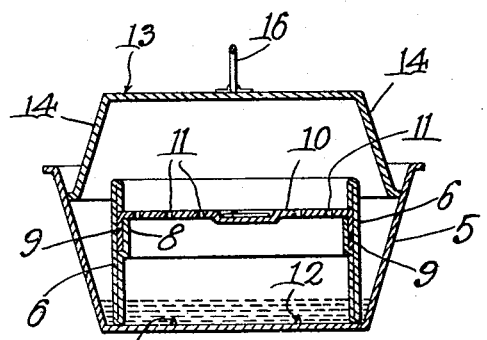
Erick Silen  Inventor
By C.A.Snow&Co.
Attorneys Patented June 12, 1928.

1,673,164

UNITED STATES PATENT OFFICE.

ERICK SILEN, OF STELLA, WASHINGTON.

STEAMER.

Application filed August 16, 1927. Serial No. 213,361.

This invention has reference to a cooking vessel, and more particularly a steamer, the primary object of the invention being to provide means whereby articles of food such as waffles or the like may be steamed and reconditioned after the articles have set and become cooled.

Another object of the invention is to provide a device of this character which may be efficiently used as a means for heating articles of food to warm them, to make them more palatable.

Another important object of the invention is to provide a device of this character which may be disassembled and parts thereof used as a cooker, roaster or baking pan.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a steamer constructed in accordance with the invention, the same being partly broken away.

Figure 2 is a sectional view taken on line 2—2 of Figure 1.

Figure 3 is a sectional view taken on line 3—3 of Figure 1.

Referring to the drawing in detail, the reference character 5 designates the outer or main receptacle, which has substantially wide sides, as clearly shown by Figure 2 of the drawing.

Positioned within the main receptacle 5 is a rack or support which is rectangular in formation and has vertical walls 6, the rack being constructed of a length of sheet metal bent upon itself, the end portions terminating adjacent to each other, one of the end portions being offset as at 8 to receive the downwardly extended flanges 9 of the tray 10 which is formed with openings 11 to allow steam to pass upwardly therethrough and contact with the articles supported thereon.

Formed in the lower edges of the vertical walls are openings 12 that allow water to pass to the space between the vertical walls and inclined walls of the main receptacle, so that steam arising from the water held between the vertical walls and inclined walls may pass upwardly, to contact with the cover where it will be directed downwardly to contact with the articles of food resting on the tray 10, to moisten the articles of food.

The cover is indicated generally by the reference character 13 and has a flange 14 inclined outwardly as shown by Figure 2, to the end that the steam contacting with the inclined flange will be directed downwardly.

A vent opening 15 is formed in the cover to allow steam to pass therefrom to signal to an attendant that the water has reached a boiling state. In order that the cover may be conveniently removed and replaced, a handle 16 is provided, the same being secured to the upper surface of the cover as clearly shown by Figure 2.

Handles 17 are secured to the main receptacle and afford means whereby the device may be readily removed from place to place.

From the foregoing it will be seen that due to this construction, articles of food such as waffles or the like may be positioned on the tray 10 and the device positioned on a stove to heat the water contained therein, the steam arising from the water, contacting with both sides of the articles of food resting on the tray 10 to maintain the food warm.

I claim:

In a steamer of the class described, a main receptacle including a removable cover, a rectangular rack including a length of metal having its upper edge bent downwardly and having its lower edge bent upwardly, the upper extremity of the lower edge being offset, a tray having downwardly extended flanges fitted within the offset portion to secure the tray in spaced relation with the upper and lower edges of the rack, and said tray having openings formed therein to permit steam to pass therethrough.

In testimony that I claim the foregoing as my own, I have hereto affixed my signature.

ERICK SILEN.